US012792564B2

(12) United States Patent
Sharon et al.

(10) Patent No.: US 12,792,564 B2
(45) Date of Patent: Nov. 10, 2026

(54) DATA STORAGE SYSTEMS AND PROCESSES FOR DATA SEARCHING AND ORGANIZATION

(71) Applicant: Sandisk Technologies, Inc., Milpitas, CA (US)

(72) Inventors: Eran Sharon, Rishon Lezion (IL); Ran Zamir, Ramat Gan (IL); Alexander Bazarsky, Holon (IL); Ariel Navon, Revava (IL)

(73) Assignee: Sandisck Technologies, Inc., Milpitas, CA (US)

( * ) Notice: Subject to any disclaimer, the term of this patent is extended or adjusted under 35 U.S.C. 154(b) by 47 days.

(21) Appl. No.: 18/816,377

(22) Filed: Aug. 27, 2024

(65) Prior Publication Data

US 2026/0064632 A1 Mar. 5, 2026

(51) Int. Cl.

*G06F 17/00* (2019.01)
*G06F 16/13* (2019.01)
*G06F 16/14* (2019.01)
*G06F 21/62* (2013.01)

(52) U.S. Cl.

CPC ............ *G06F 16/13* (2019.01); *G06F 16/148* (2019.01); *G06F 21/6218* (2013.01)

(58) Field of Classification Search

CPC ..... G06F 16/13; G06F 16/148; G06F 21/6218
See application file for complete search history.

(56) References Cited

U.S. PATENT DOCUMENTS

| | | | | |
|---|---|---|---|---|
| 6,081,774 | A | 6/2000 | de Hita et al. | |
| 8,356,032 | B2 | 1/2013 | Kim et al. | |
| 11,275,905 | B2 | 3/2022 | Farri et al. | |
| 12,536,213 | B2 * | 1/2026 | Crabtree | G06F 16/3344 |
| 2014/0310279 | A1 * | 10/2014 | Taljanovic | G06F 16/285 707/737 |
| 2019/0266257 | A1 * | 8/2019 | Natchu | G06F 16/137 |

FOREIGN PATENT DOCUMENTS

WO 2021042084 A 3/2021

OTHER PUBLICATIONS

Nascimento et al. Text-to-SQL Meets the Real-World. ICEIS, Apr. 2024. vol. 1, pp. 61-72. (Year: 2024).*

(Continued)

*Primary Examiner* — Greta L Robinson
(74) *Attorney, Agent, or Firm* — Patterson + Sheridan, LLP

(57) ABSTRACT

A set of metadata is generated for a file based on file characteristics and a vector embedding is calculated using the set of metadata. A distance between the vector embedding and at least one other vector embedding is used to determine the file storage location. The at least one other vector embedding represents at least one other corresponding set of metadata generated for at least one other file. In one aspect, a combined access latency for the file and the at least one other file is considered in determining the storage location. In another aspect, a text based request is received to search for at least one file indicating a criterion not specifically identifying the at least one file. The text based request is converted into a structured command using a Large Language Model (LLM) to identify at least one storage location for the at least one file.

10 Claims, 6 Drawing Sheets

(56) References Cited

OTHER PUBLICATIONS

Managing Metadata (File and File Store Attributes). The Java Tutorials, 2023, pp. 1-18. /https://docs.oracle.com/javase/tutorial/essential/io/fileAttr.html (Year: 2023).*
Ma et al. A Comprehensive Survey on Vector Database: Storage and Retrieval Technique, Challenge. Journal of LaTex Class Files 14:8, 2021, pp. 1-24. (Year: 2021).*

* cited by examiner

26

| LBAs / OIDs | Metadata Sets / Vector Embeddings | Permissions |
|---|---|---|
| A - C | 0, 20, 8, ... 9, 11, 15, 1 | L |
| D - E | 31, 2, 4, ... 16, 12, 7, 0 | H |
| ⋮ | ⋮ | ⋮ |
| X - Z | 3, 10, 14, ... 7, 6, 1, 0 | M |

DATA STORAGE SYSTEMS AND PROCESSES FOR DATA SEARCHING AND ORGANIZATION

BACKGROUND

Increasing amounts of data are being stored in local storage devices and in remote storage devices, such as for cloud based applications and for social media. The efficient searching, retrieving, and organization of data is becoming increasingly important as more data is being stored in today's storage devices.

In some cases, a user may not know or remember a particular file name or object name and may only remember certain attributes of the file or data object or its content. For example, a user may want to search for a file that was stored around two to three years ago that included a chart with plans for a trip to Portugal and included phone numbers for hotels in Lisbon. As another example, a user may want to search for a photo taken around five years ago in Northern Thailand showing them in a red t-shirt with a river and elephants in the background. Searching for a specific file or data object with only such search criteria can be difficult and typically involves the user retrieving and checking many different files or data objects.

Some operating systems may allow for structured search tools, but these search tools are fairly limited in their options for search criteria. Typically, such search tools can search based on a specific file attribute, such as a file name or an exact storage or modification date.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Data Storage Systems

Figure 1:
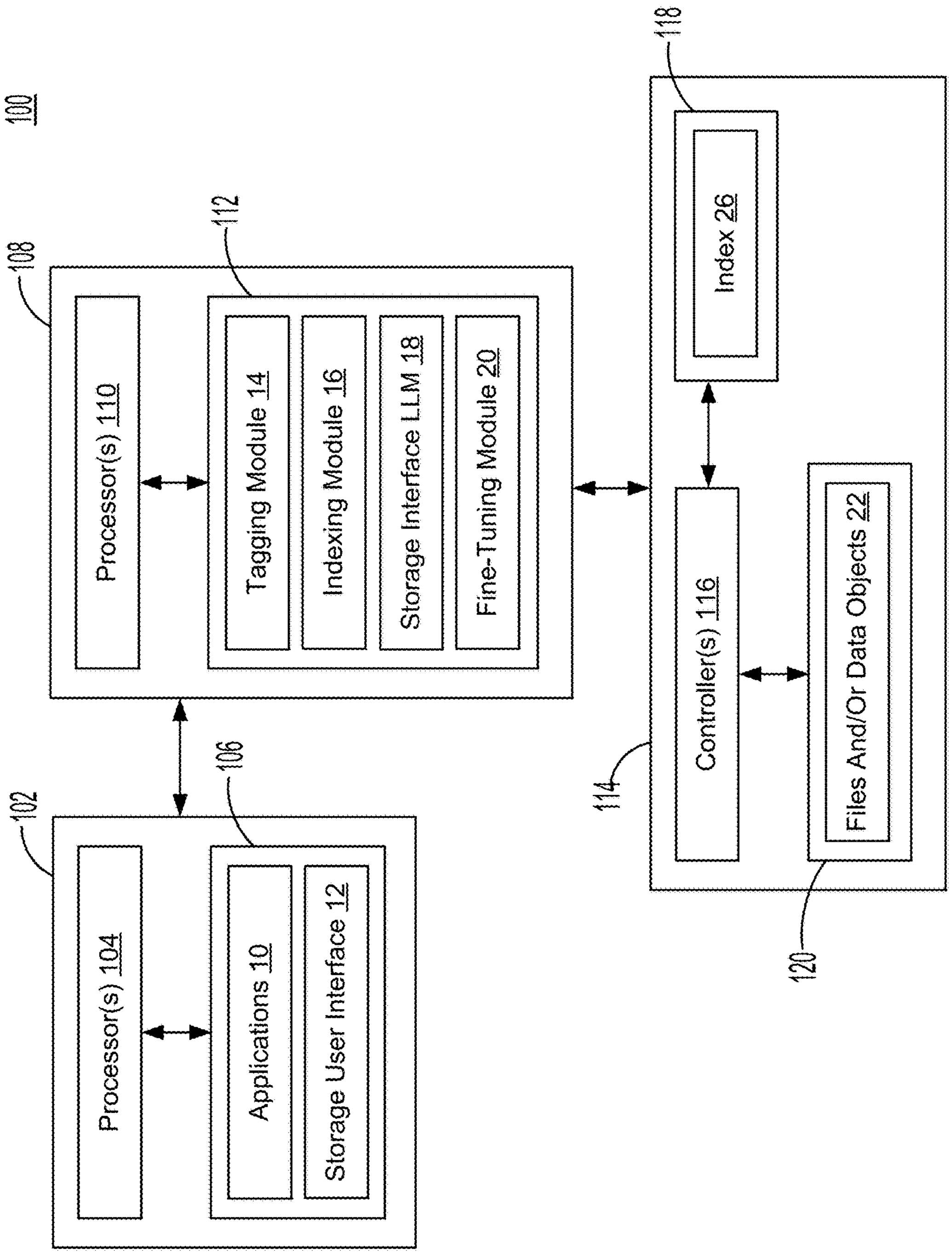
FIG. 1 is a block diagram of an example data storage system according to one or more embodiments.

FIG. 1 is a block diagram of an example of data storage system 100 for storing and retrieving files and/or data objects according to one or more embodiments. As shown in FIG. 1, data storage system 100 includes host 102, storage interface 108, and storage device 114. In some implementations, host 102, storage interface 108, and storage device 114 can form, for example, a computer system, such as a desktop, laptop, or a client and a server. In this regard, host 102, storage interface 108, and storage device 114 may be housed separately, such as where host 102 and storage interface 108 form a client accessing storage device 114 as a server, such as for a cloud storage service. In other implementations, host 102, storage interface 108, and storage device 114 may be housed together as part of a single electronic device. In this regard, storage interface 108 can include, for example, a hardware accelerator of storage device 114 or of host 102. In other implementations, storage interface 108 may be implemented by host 102 or by storage device 114.

Host 102 includes one or more processors 104 and one or more local memories 106. Processor(s) 104 can include, for example, circuitry such as one or more Central Processing Units (CPUs), Graphics Processing Units (GPUs), microcontrollers, Digital Signal Processors (DSPs), Application-Specific Integrated Circuits (ASICs), Field Programmable Gate Arrays (FPGAs), hard-wired logic, analog circuitry and/or a combination thereof. In some implementations, processor(s) 104 can include a System on a Chip (SoC) that may be combined with one or more memories 106 of host 102. In the example of FIG. 1, processor(s) 104 execute instructions, such as instructions from applications 10, storage user interface 12, an operating system of host 102, or other applications executed by host 102.

Host 102 can communicate with storage device 114 using storage interface 108 via a bus or network, which can include, for example, a Compute Express Link (CXL) bus, Peripheral Component Interconnect express (PCIe) bus, a Network on a Chip (NoC), a Local Area Network (LAN), or a Wide Area Network (WAN), such as the internet or another type of bus or network. In some examples, host 102 and/or storage interface 108 can include software for controlling communication with storage device 114, such as a device driver of an operating system of host 102.

As shown in the example of FIG. 1, host 102 includes its own local memory or memories 106, which can include, for example, a Dynamic Random Access Memory (DRAM), Static Random Access Memory (SRAM), Magnetoresistive RAM (MRAM) or other type of Storage Class Memory (SCM), or other type of solid-state memory. Memory or memories 106 store applications 10 or portions thereof, in addition to storage user interface 12.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), MRAM, 3D-XPoint memory, and/or other discrete Non-Volatile Memory (NVM) chips, or any combination thereof.

In the example of FIG. 1, memory or memories 106 of host 102 store applications 10, or portions thereof for execution by processor(s) 104. Applications 10 can create, modify, or otherwise access files or data objects stored in storage device 114. Such applications can include, for example, word processing programs, video or image viewing or editing programs, streaming applications, audio playback or editing programs, spreadsheet programs, document publishing programs, and internet browsers.

As described in more detail below, storage user interface 12 provides a free text based interface for searching for files or data objects stored in storage device 114. Storage interface Large Language Model (LLM) 18 of storage interface 108 can translate free text based search requests input to storage user interface 12, such as by a user of host 102 or by an application 10, into one or more structured commands that are provided to one or more controllers 116 of storage device 114. In some implementations, storage user interface 12 can include a voice to text transcription module to transcribe a verbal request from a user into a free text request.

In addition, storage user interface 12 can provide a free text based interface for generating other types of commands via storage interface LLM 18, such as a folder creation command for organizing files or data objects, a copy command to copy files or data objects, a move command to move a file or data object to a different file or data object location within a file system or group of data objects, or a delete command for deleting a file or data object.

In the example of FIG. 1, storage interface 108 includes one or more processors 110 and one or more memories 112. Processor(s) 110 can include, for example, circuitry such as one or more CPUs, GPUs, microcontrollers, DSPs, ASICs, FPGAs, hard-wired logic, analog circuitry and/or a combination thereof. Memory or memories 112 can include, for example, DRAM, SRAM, MRAM or other type of SCM, or other type of solid-state memory. In some implementations, processor(s) 110 and the one or more memories 112 can be combined into an SoC.

As shown in FIG. 1, memory or memories 112 of storage interface 108 store tagging module 14, indexing module 16, storage interface LLM 18, and fine-tuning module 20. In some implementations, one or more of tagging module 14, indexing module 16, storage interface LLM 18, and fine-tuning module 20, or portions thereof, may be loaded by processor(s) 110 from storage device 114 into one or more memories 112 for handling requests from host 102 to store data in storage device 114 and/or to retrieve data from storage device 114. As discussed in more detail with reference to FIGS. 2 and 3 below, storage interface 108 may have knowledge about a particular order for loading tagging module 14, indexing module 16, storage interface LLM 18, or portions thereof, to facilitate efficient use of memory or memories 112 of storage interface 108.

Tagging module 14 can include executable instructions for one or more processors 110 to analyze a file or data object for storage in storage device 114. The file or data object is analyzed by tagging module 14 to generate a set of metadata or tags from characteristics of the file or data object that describe the file or data object. The characteristics used to generate the set of metadata can include both content based information and non-content based information determined from the file or data object by tagging module 14.

For example, the non-content based information can include external attributes or characteristics of the file or data object such as a file name or object name, a file type or object type (e.g., a text file or object, a document file or object, an image file or object, or an audio file or object), a source of the file or data object (e.g., if the file or data object was received from an operating system, a spreadsheet program, or as an email attachment), a relevant date for the file or data object (e.g., a creation date or a modification date of the file or data object), and a data size (e.g., in bytes) for the file or data object.

Content based information used by tagging module 14 can include a description of the file or data object's content. In some implementations, this can include tagging module 14 using different content analyzers, Artificial Intelligence (AI) models, or agents to produce a detailed description of the file or data object's content. For example, tagging module 14 can include image to text converters to provide a textual description of an image from which a set of metadata is generated. The textual description can include multiple levels of description of the image such as a high level description of the content (e.g., background color, text font, number of figures, photos, or formulas) and a lower level of description for each part of the file or data object and/or for each type of element in the file or data object's content (e.g., a description for each of five different graphs).

As another example, tagging module 14 can include the transcription of audio files into text to generate a set of metadata describing the file's content. In some cases, for example, a sequence to sequence attention based model may be used in generating the metadata. As with an image file, the content information for an audio file can include different levels of information, such as a genre or type of music, a band or singer name, or a number of songs.

Another example can include tagging module 14 analyzing a text from the file or data object, such as by using an LLM to describe or summarize the content of the text. In this regard, tagging module 14 may use an analyzer, agent, or AI model that is related to the specific type of content data to be analyzed. In some cases, different analyzers, agents, and/or AI models can be used for the same file or data object to analyze different parts of the file or data object's content, such as using an image analyzer for images within a document and using a text analyzer for text in the document. In addition, only particular analyzers, agents, or AI models, or portions of tagging module 14, that are needed for a particular data type being analyzed may be loaded from storage device 114 to reduce the memory footprint of tagging module 14 at storage interface 108.

Indexing module 16 can include executable instructions for one or more processors 110 to create an index entry in index 26 of storage device 114 to enable efficient searching and retrieval of one or more files or data objects stored in main storage 120 of storage device 114. Some implementations of indexing module 16 may use a hash function to generate identifiers for the entries in index 26. Indexing module 16 may also calculate a vector embedding in some implementations that describes a set of metadata generated for a file or data object by tagging module 14.

As discussed below in more detail, vector embeddings representing different files or data objects can facilitate a more efficient search, storage, and retrieval of files and data objects by determining a distance between the vector embeddings for different files or data objects in a vector embedding space that can indicate that the files or data objects are related or similar. For example, controller(s) 116 of storage device 114 may use a distance between the vector embeddings corresponding to different files or data objects to determine storage locations in main storage 120 that considers a combined read latency and/or write latency for accessing both files or data objects so that related or similar files or data objects can be accessed concurrently or with greater parallelism.

Storage interface LLM 18 can include executable instructions for one or more processors 110 to translate free text requests received from storage user interface 12 of host 102 into one or more structured commands. In the example of FIG. 1, storage interface LLM 18 can be trained to understand free text requests and translate the free text requests into structured commands that can be used by controller(s) 116 to search, retrieve, or organize the storage of files or data objects in main storage 120 of storage device 114.

For example, a text based request to search for certain files meeting different search criteria that is received by storage interface LLM 18 from storage user interface 12 can provide a structured search command to controller(s) 116 to search for files having certain file types, created within a date range, and including at least one of three particular content features. The storage interface LLM 18 may also further generate structured commands for controller(s) 116 that may be used by host 102, such as by a file system, operating system, or other application of host 102, to create a new folder and copy the retrieved files from the search into the new folder, for example.

Fine-tuning module 20 can include executable instructions for one or more processors 110 to provide additional training for storage interface LLM 18 to adjust how text based requests are converted into structured commands based on new training samples including additional files or data objects for stored in storage device 114. The fine-tuning performed by fine-tuning module 20 follows the pre-training of storage interface LLM 18 and is significantly lighter in computations, cost, time, and the amount of data used for pre-training. The fine-tuning performed by fine-tuning module 20 can better tailor the translation of the text based requests received by storage interface LLM 18 to the specific user applications, files, or data objects being stored by users accessing storage device 114.

In addition, fine-tuning module 20 may also use the additional files or data objects and/or feedback representing searches for files or data objects stored in storage device 114 to adjust at least one of how sets of metadata are generated and how vector embeddings are calculated by tagging module 14 or an analyzer, agent, or AI model used by tagging module 14. The feedback representing the searches can, in some implementations, be used as a supervised learning metric that may represent feedback provided by one or more users and/or applications of data storage system 100 or feedback derived from actions taken by the one or more users and/or applications, such as continuing with a search using a similar text based request after retrieving one or more files or data objects in response to a first text based request. The feedback representing the searches can alternatively or additionally be used to adjust how storage interface LLM 18 converts text based requests into structured commands.

As shown in the example of FIG. 1, storage device 114 includes controller(s) 116, one or more memories 118 storing index 26, and main storage or NVM 120 storing files and/or data objects 22. Controller(s) 116 can include, for example, circuitry such as one or more CPUs, GPUs, microcontrollers, DSPs, ASICs, FPGAs, hard-wired logic, analog circuitry and/or a combination thereof. In this regard, controller(s) 116 may be referred to herein more generally as a processor or processors.

Memory or memories 118 of storage device 114 can include, for example, DRAM, SRAM, MRAM or other type of SCM, or other type of solid-state memory. In some implementations, processor(s) 110 and the one or more memories 112 can be combined into an SoC. In the example of FIG. 1, memory or memories 118 provide a low latency access memory as compared to main storage 120 to facilitate faster access to index 26. For example, memory or memories 118 can include a flash SLC partition of main storage NVM 120 that can be read and written faster than a flash MLC partition of main storage NVM 120. Memory or memories 118 may also differ from main storage 120 in other ways, such as by using a higher memory refresh rate, stronger error correction coding, or a memory type that is more resilient to reads and/or writes to provide greater protection of the data stored in index 26 due to its higher frequency of access and/or significance in facilitating the search for files or data objects stored in main storage 120.

Those of ordinary skill in the art will appreciate with reference to the present disclosure that other implementations of data storage system 100 may differ. For example, storage interface 108 may form part of host 102 or part of storage device 114 such that processor(s) 110 and memory or memories 112 of storage interface 108 are replaced by processor(s) 104 and memory or memories 106 of host 102, or are replaced by controller(s) 116 and memory or memories 118 of storage device 114. As another example variation, one or more of tagging module 14, storage interface LLM 18, indexing module 16, and fine-tuning module 20, or portions thereof, may not be executed by data storage system 100 but may instead be executed by a remote server or by a cloud service in communication with data storage system 100.

As yet another example, index 26 may include multiple data structures, such as a vector database and a vector index. In such an implementation, the vector database portion of index 26 can store vector embeddings for files or data objects and the vector index may store vector metadata, such as file or data object storage locations in main storage 120 or permission levels for accessing the corresponding files or data objects. In some cases, a pre-filtering or post-filtering may also be performed using vector metadata to reduce the search field or the number of matching vector embedding results for a search.

Figure 2:
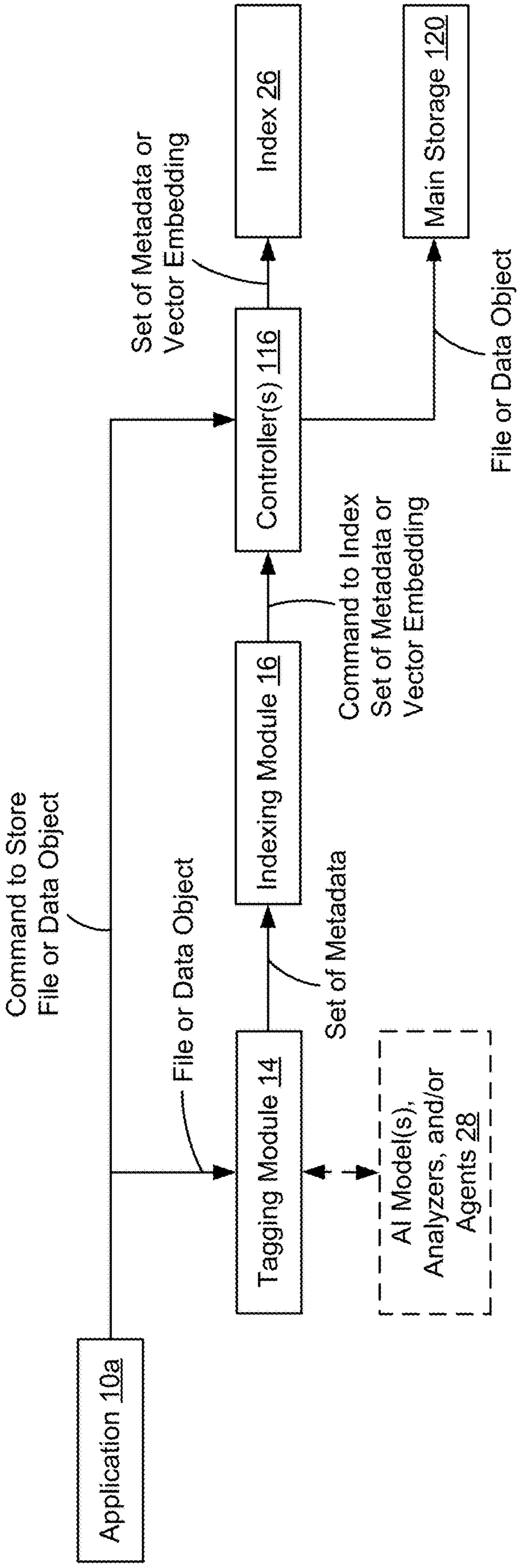
FIG. 2 depicts an example of storing data in a main storage according to one or more embodiments.

FIG. 2 depicts an example of storing data in NVM main storage 120 according to one or more embodiments. As shown in the example of FIG. 2, application 10*a* executed by host 102 provides a command to store a file or data object to controller(s) 116 of storage device 114, which may be accomplished via an operating system of host 102 and/or via storage interface 108. Tagging module 14 intercepts or otherwise receives the file or data object and optionally uses one or more AI models, analyzers, or agents 28 to analyze the file or data object to generate a corresponding set of metadata or tags describing the file or data object.

The set of metadata or tags are then provided to indexing module 16 of storage interface 108 to create an index command for controller(s) 116 to add an entry to index 26 for the generated set of metadata or for a vector embedding calculated from the generated set of metadata. In this regard, indexing module 16 in some implementations may calculate a vector embedding for the file or data object by transforming the corresponding set of metadata from tagging module 14 into a high dimensional vector embedding representing the set of metadata for the file or data object. In some implementations, indexing module 16 may also calculate a hash function of the generated metadata or vector embedding to provide an index value to controller(s) 116 for locating the entry in index 26. In other implementations, indexing module 16 may include the location of the new entry in the index command sent to controller(s) 116.

In some implementations, storage interface 108 may use its knowledge of the order or sequence of generating sets of metadata by tagging module 14, calculating vector embeddings, and creating a command to index the set of metadata or vector embedding by indexing module 16 to intelligently load or prepare for loading tagging module 14 and indexing module 16, or portions thereof into a memory or memories 112 of the storage interface 108 to conserve processing and memory resources. Similarly, storage interface 108 may also use its knowledge of the data search process discussed below with respect to FIG. 3 to selectively load storage interface LLM 18 or portions thereof to conserve processing and memory resources. For example, weight values used by storage interface LLM 18 may be loaded at a different time than weight values loaded used by tagging module 14 or indexing module 16 depending on a stage of a storage request or a stage of a search request.

Controller(s) 116 updates index 26 with the set of metadata or vector embedding received from indexing module 16 and can also use information provided by indexing module 16 and/or index 26 to determine a storage location in main storage 120 for the file or data object. For example, indexing module 16 or controller(s) 116 may determine a distance in a vector embedding space between a vector embedding for the file or data object and at least one other file or data object. The storage location for the file or data object in main storage 120 may be determined to reduce an indication of a combined read latency and/or an indication of a combined write latency for the file or data object and one or more similar or related files or data objects to improve the data access performance of storage device 114. In such implementations, vector embeddings that are clustered together in the vector embedding space can represent similar files or data objects that have metadata in common or similar patterns of metadata.

In some cases, an Approximate Nearest Neighbor (ANN) search can be performed with operations such as determining a cosine of an angle between vectors, a Euclidian distance between vectors, or a dot product between vectors to determine the distance between the vector embedding and at least one other vector embedding for a file that is stored in main storage 120 or is to be stored in main storage 120. The performance of storage device 114 can be improved as a whole by storing similar or related files or data objects in storage locations that facilitate a faster combined reading and/or combined writing of such similar or related files or data objects since these files or data objects are more likely to be accessed together or in close temporal proximity to each other.

In one example, similar or related files or data objects may be stored in the same Flash Memory Unit (FMU) in main storage 120, such as in the same word line in the same flash die for concurrent access. In another example, similar or related files or data objects may be stored in corresponding storage locations in different flash dies for parallel reading and/or writing. In a similar example applied to cases where main storage 120 includes rotating magnetic media as in a Hard Disk Drive (HDD), similar or related files or data objects may be stored in the same or nearby radial or track location on different circumferentially aligned disk surfaces that are stacked so that the similar or related files or data objects can be concurrently or approximately concurrently read or written as a Head Stack Assembly (HSA) is positioned to the radial or track location.

In addition, controller(s) 116 and/or indexing module 16 may use such distances to reorganize index 26 and/or relocate files or data objects in main storage 120 so that files or data objects with vector embeddings having less distance between them are stored in new locations to provide faster access of related or similar files or data objects. In some implementations, this reorganization may be performed as part of a garbage collection process of main storage 120 to free up storage space being occupied by obsolete data.

Figures 3, 4:
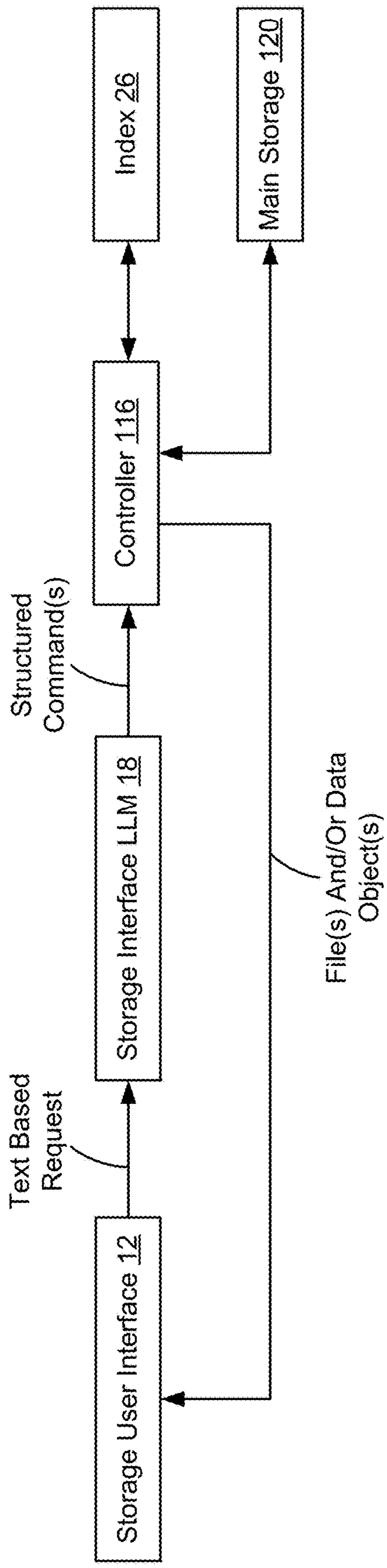
FIG. 3 depicts an example of retrieving data from a main storage according to one or more embodiments.
FIG. 4 is an example of an index according to one or more embodiments.

FIG. 3 depicts an example of retrieving data from main storage 120 according to one or more embodiments. As shown in FIG. 3, storage user interface 12 generates a text based request, which may originate from a user of host 102 or an application executed by host 102. The text based request can include, for example, a free text request to search for a particular file or group of files or data objects that have certain attributes, which may include content based search criteria and/or non-content based search criteria.

The storage interface LLM 18 translates the text based request into one or more structured commands, including a search command. In some cases, a single text based request can cause storage interface LLM 18 to generate multiple structured commands, such as multiple search commands or a mixture of different command types, such as a search command and a copy command for the files or data objects identified in the search.

In some implementations, the search command can include query metadata that is arranged to follow a format used by tagging module 14 in generating a set of metadata for a file or data object to be stored in main storage 120. In such implementations, the search commands may only have values for one or a few of the metadata categories included in the sets of metadata generated by tagging module 14. For example, the text based request may include a request for a photo taken about two years ago on a boat with an island in the background. Storage interface LLM 18 may translate this free text search request into a structured command to retrieve files and data objects that have non-content attributes of being an image file type created between one to three years ago and that have content attributes of including a body of water, a boat, or an island. By following the format used by tagging module 14 to generate sets of metadata, controller(s) 116, can use index 26 to identify matching or similar files or data objects meeting the search criteria. In other implementations, processor(s) 110 of storage interface 108 or processor(s) 104 of host 102 can use index 26 to identify the matching or similar files or data objects.

In some implementations, the search for matching or similar files or data objects can include calculating a search vector embedding, such as by indexing module 16 or controller(s) 116, that is used to perform an ANN search of vector embeddings stored in index 26. In such implementations, a certain number of nearest or most similar vector embeddings with respect to the search criteria can be returned, which may also be ranked or include a score as to similarity. A pre-filtering or post-filtering may also be performed using vector metadata to reduce the search field or the number of similar vector embedding results.

Controller(s) 116 may also use index 26 in FIG. 3 to identify one or more storage locations for one or more files or data objects stored in main storage 120 that correspond to the matching or similar sets of metadata or vector embeddings identified in index 26. In some implementations, index 26 can include identifiers for the files or data objects that correspond to the sets of metadata or vector embeddings, such as Logical Block Addresses (LBAs) or Object IDs (OIDs). Controller(s) 116 can then use these identifiers with, for example, a translation table that translates these logical identifiers to physical storage location identifiers (e.g., Physical Block Addresses (PBAs)) in main storage 120. In other implementations, index 26 may include the physical storage location identifiers without needing to translate from a logical identifier for the file or data object. After identifying the storage location or locations, the one or more matching or similar files or data objects are then retrieved from main storage 120 by controller(s) 116 in the example of FIG. 3 and returned to storage user interface 12.

The foregoing use of storage interface LLM 18 and index 26 with the generation of sets of metadata by tagging module 14 for files or data objects being stored in main storage 120 can facilitate a significantly wider range of search criteria as compared to current data search tools. In addition, the use of storage interface LLM 18 can enable users to take advantage of the wider range of search criteria without needing to learn the requirements of particular software or formats for structured commands since storage user interface 12 and storage interface LLM 18 can work together to facilitate free text requests.

Those of ordinary skill in the art will appreciate with reference to the present disclosure that other implementations of data storage and data retrieval may differ from the examples provided above for FIGS. 3 and 4. For example, the searching of index 26 may be performed by processor(s) 110 of storage interface 108 or by processor(s) 104 of host 102 instead of by controller(s) 116 of storage device 114. In such examples, host 102 or storage interface 108 may search index 26 and provide controller(s) 116 with logical identifiers for the matching or similar files or data objects in main storage 120 by providing, for example, LBAs or OIDs for the matching or similar files or data objects. As another example variation, the updating of index 26 may be performed by processor(s) 110 of storage interface 108 or by processor(s) 104 of host 102 instead of by controller(s) 116 of storage device 114.

FIG. 4 is an example of an index 26 according to one or more embodiments. As shown in the example of FIG. 4, index 26 includes logical identifiers (i.e., LBAs or OIDs) for different files or data objects stored in main storage with corresponding entries for metadata sets or vector embeddings that have been generated or calculated based on characteristics of the file or data object.

Index 26 in FIG. 4 also includes a permission level for the file or data object (i.e., L, M, H), which can be used to limit access to certain files or data objects based on the user or application that originated the access request (e.g., a search request or a modification request). In this regard, the permission level in some implementations can indicate whether a particular user or group of users, such as a particular organization or department within an organization, has permission to access the file or data object. In some implementations, the permission level may specify whether the user or application has permission to only read the file or data object or permission to also modify the file or data object. The permission level may also be used during the search processes of FIG. 3 discussed above or FIG. 6 discussed below to limit or pre-filter the search results for files or data objects that match or are similar to search criteria, which can reduce the resources needed to perform the search in some implementations by reducing the search pool.

The order of the values in the metadata sets or vector embeddings can represent different attributes or characteristics described or indicated by the metadata or different dimensions of the vector embeddings that facilitate the searching of index 26 for similar or matching files or data objects. In some cases, the entries in index 26 can be organized based on a particular attribute or characteristic of the files or data objects, such as by grouping the sets of metadata or vector embeddings for certain file types in index 26 to enable faster searching.

As noted above, controller(s) 116 of storage device 114 may also maintain coherence between index 26 and the files or data objects stored in main storage 120. For example, when a file or data object is deleted in main storage 120, a controller 116 may identify an entry in index 26 by its logical identifier or by using an inverse table that identifies the entry in index 26 by an identifier for the deleted file or data object and delete the entry or mark the entry as being obsolete for future garbage collection of index 26 to free up space in index 26.

In addition, indexing module 16, for example, may split sets of metadata into multiple entries in index 26, group multiple sets of metadata into a single entry in index 26, change the metadata values, or format of the metadata sets in index 26 based on feedback from searches and/or additional files or data objects stored in main storage 120. In some cases, vector embeddings included in index 26 may be recalculated using, for example, updated weights or a different number of dimensions based on feedback from searches and/or additional files or data objects stored in main storage 120.

Those of ordinary skill in the art will appreciate with reference to the present disclosure that other implementations of index 26 may differ and that the example of index 26 in FIG. 4 is provided for the purposes of illustration. For example, some implementations may include a separate data structure for associating permission levels with different files or data objects. As another example variation, index 26 may use hash values to identify the different sets of metadata or vector embeddings instead of logical identifiers. As yet another example, index 26 may include a separate vector metadata index indicating corresponding storage locations that is separate from a vector database of index 26 that stores the vector embeddings.

Example Processes

Figure 5:
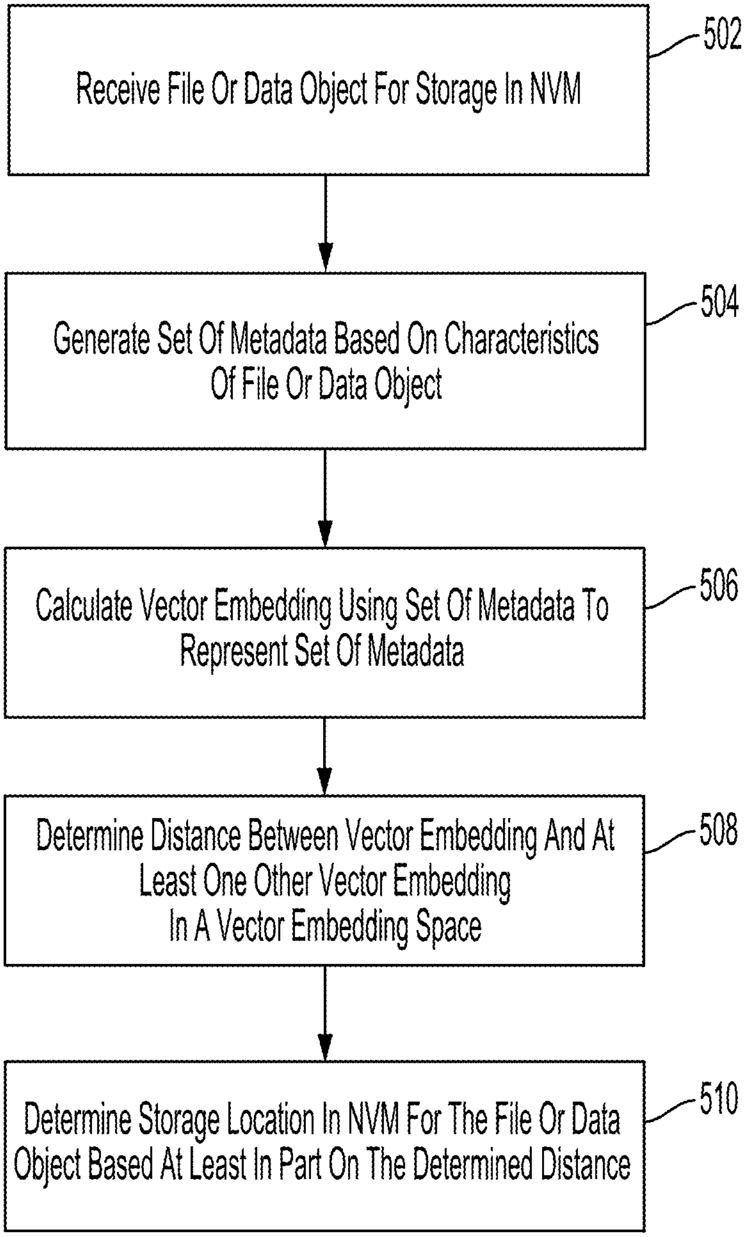
FIG. 5 is a flowchart for a data storage process according to one or more embodiments.

FIG. 5 is a flowchart for a data storage process according to one or more embodiments. The process of FIG. 5 can be performed by, for example, processor(s) 110 of storage interface 108, processor(s) 104 of host 102, and/or controller (s) 116 of storage device 114 in FIG. 1 executing tagging module 14, indexing module 16, and storage interface LLM 18. In this regard, processor(s) 110, processor(s) 104, and/or controller(s) 116 can, in some implementations, comprise a means for performing the functions of the storage process of FIG. 5.

In block 502, a file or data object is received for storage in an NVM, such as in main storage 120 of storage device 114 in FIG. 1. The file or data object may be received by a storage controller of the storage device and also by a tagging module of a storage interface. The file or data object may originate from an application executed on a host.

In block 504, a set of metadata is generated based on characteristics of the file or data object. The generated set of metadata can follow a particular format so that the order of the metadata values or information in the set can indicate particular characteristics describing the file or data object. In some implementations, a tagging module of a storage interface generates the set of metadata using content based information and/or non-content based information determined from the file or data object. For example, the non-content based information can include external attributes or characteristics of the file or data object such as a file name or object name, a file type or object type, a source of the file or data object, a relevant date for the file or data object, and a data size for the file or data object.

Content based information used to generate the set of metadata can include a description of the file or data object's internal content. In some implementations, this can include using different content analyzers, AI models, and/or agents to produce a detailed description of the file or data object's content. For example, an image to text converter can provide a textual description of an image from which a set of metadata is generated. As another example of using content based information, an audio transcriber can transcribe audio file content into metadata describing the file's content. In some cases, a sequence to sequence attention based model may be used in generating the metadata. Another example of using content based information can include analyzing a text from the file or data object, such as by using an LLM to describe or summarize the content of the text. In some cases, different analyzers, agents, or AI models can be used for the same file or data object to analyze different parts of the file or data object's content.

In block 506, a vector embedding is calculated using the generated set of metadata to represent the set of metadata. In some implementations, the set of metadata can be transformed using at least one weighted mathematical operation that provides a high dimensional vector in a vector embedding space. As discussed in more detail below with reference to FIG. 7, the weighting or operations used to transform the set of metadata may be adjusted over time based on feedback received on search results and/or new files or data objects being stored in the NVM.

In block 508, a distance is determined between the vector embedding calculated in block 506 and at least one other vector embedding in the vector embedding space. As discussed above, an ANN search can be performed to identify the closest vector embeddings representing files or data objects that may already be stored in the NVM or representing one of more files or data objects whose storage in the NVM is pending. A vector database and vector metadata index can be used in some implementations to identify the vector embeddings that are closest or have the shortest distance to the vector embedding calculated in block 506.

In block 510, a storage location in the NVM is determined for the file or data object based at least in part on the distance determined in block 508. In some implementations, an index or table that associates the closest vector embeddings or their logical identifiers with a physical storage location identifier can be used. As discussed above, the performance of the storage system can be improved as a whole over time by storing similar or related files or data objects in storage locations that facilitate a faster combined reading and/or combined writing of such similar or related files or data objects since these files or data objects are more likely to be accessed together or within a close timeframe to each other. This can include storing similar or related files or data objects in the same FMU, such as in the same word line in the same flash die or in corresponding storage locations in different flash dies for parallel reading, or in the same or nearby radial or track location on different circumferentially aligned disk surfaces in an HDD.

Those of ordinary skill in the art will appreciate with reference to the present disclosure that other implementations of the storage process of FIG. 5 may differ. For example, some implementations that do not use vector embeddings may omit block 506 and instead use a comparison between the generated set of metadata in block 506 to other sets of metadata or portions thereof to determine a storage location in the NVM.

Figure 6:
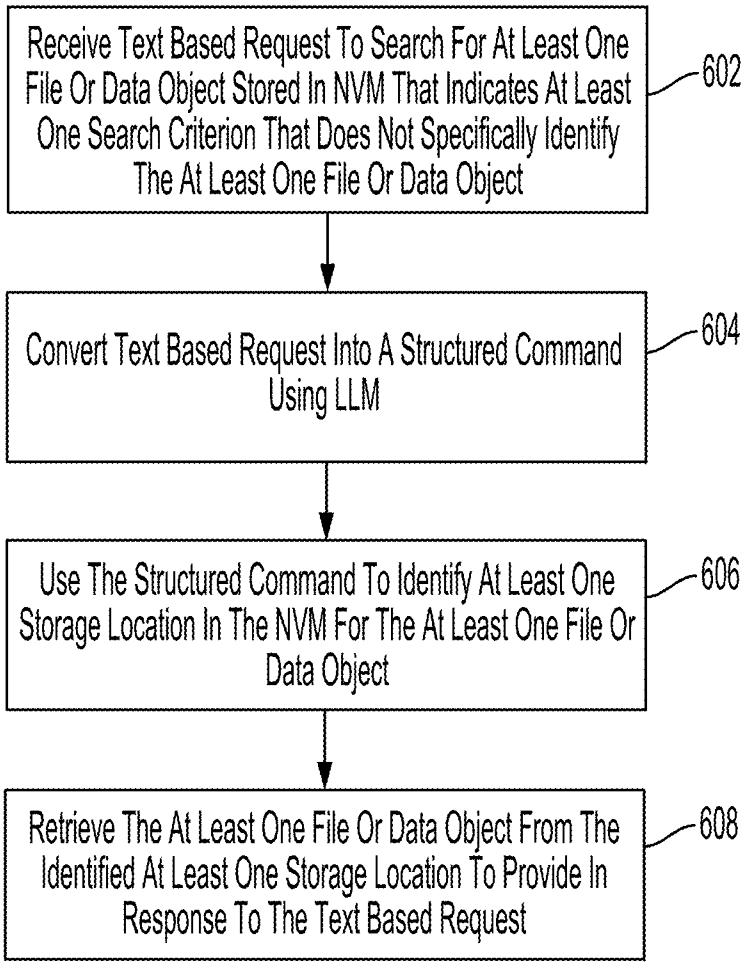
FIG. 6 is a flowchart for a data search process according to one or more embodiments.

FIG. 6 is a flowchart for a data search process according to one or more embodiments. The process of FIG. 6 can be performed by, for example, processor(s) 110 of storage interface 108, processor(s) 104 of host 102, and/or controller(s) 116 of storage device 114 in FIG. 1 executing storage interface LLM 18. In this regard, processor(s) 110, processor(s) 104, and/or controller(s) 116 can, in some implementations, comprise a means for performing the functions of the data search process process of FIG. 6.

In block 602, a text based request is received to search for at least one file or data object stored in an NVM (e.g., main storage 120 in FIG. 1) that indicates at least one search criterion that does not specifically identify the at least one file or data object. In this regard, the text based request may not include any search criteria that specifically identify the file or data object, but instead includes search criteria that may refer to the content of the file or data object or a vague description of a non-content based attribute such as an approximate creation date. The text based request can come from a storage user interface, such as storage user interface 12 in FIG. 1, and may originate from a user of a host or an application executed by the host.

In block 604, the text based request is converted into a structured command using an LLM, such as storage interface LLM 18 in FIG. 1. The LLM can be trained and provided with a prompt to use a particular format for generating the structured command. In some implementations, the storage interface LLM can generate a set of metadata that follows the format of sets of metadata generated when storing files or data objects in the NVM. In such implementations, the structured command can provide the set of metadata to a storage controller to perform a search of an index to identify matching or similar files or data objects. In other implementations, the structured command may already include one or more logical identifiers for one or more matching or similar files or data objects that have been identified by a storage interface searching an index for matching or similar sets of metadata or for nearby vector embeddings representing sets of metadata for the matching or similar files or data objects stored in the NVM. As discussed above, the index may be stored in a low latency memory of the data storage system, such as in an SCM, to facilitate faster searching of the index.

In block 606, a controller of the storage device uses the structured command from the storage interface LLM to identify at least one storage location in the NVM for the at least one file or data object requested by the text based request. In cases where the structured command already includes one or more logical identifiers for the at least one file or data object, the controller can translate the logical address into a physical storage location identifier for retrieving the at least one file or data object. In cases where the structured command provides metadata or a vector embedding representing the text based request, the controller of the storage device can search the index, such as by performing an ANN search of the index or comparing the metadata to sets of metadata stored in the index, to identify the closest vector embeddings or most similar sets of metadata and their corresponding file or data object locations in the NVM.

In block 608, the at least one file or data object is retrieved from the identified storage location(s) to provide a response to the text based request. In some implementations, the controller of the storage device may return up to a predetermined number of similar files or data objects or a number of similar files or data objects specified in the structured command from the storage interface LLM. In addition, the storage device or storage interface may include a ranking of retrieved files or data objects in terms of similarity to the at least one search criterion.

As discussed above with reference to FIGS. 2 and 5, the tagging of files or data objects as part of the storage process for files or data objects stored in the NVM can facilitate a faster retrieval of files or data objects that are likely to accessed together or in close temporal proximity to each other. As a result, the search process of FIG. 6 can benefit from the storage of such similar or related files and data objects when returning multiple files or data objects in response to a text based request that does not specifically identify the requested file or data object, such as by filename or by object name.

Those of ordinary skill in the art will appreciate with reference to the present disclosure that other implementations of the data search process of FIG. 6 may differ. For example, the text based request may include additional requests such as requests to store the files or data objects identified in the search in a new folder or to delete duplicate files or data objects identified in the search. In such examples, the storage interface LLM may generate multiple structured commands, including commands that may be directed, for example, to a file system or operating system of the host or storage interface.

Figure 7:
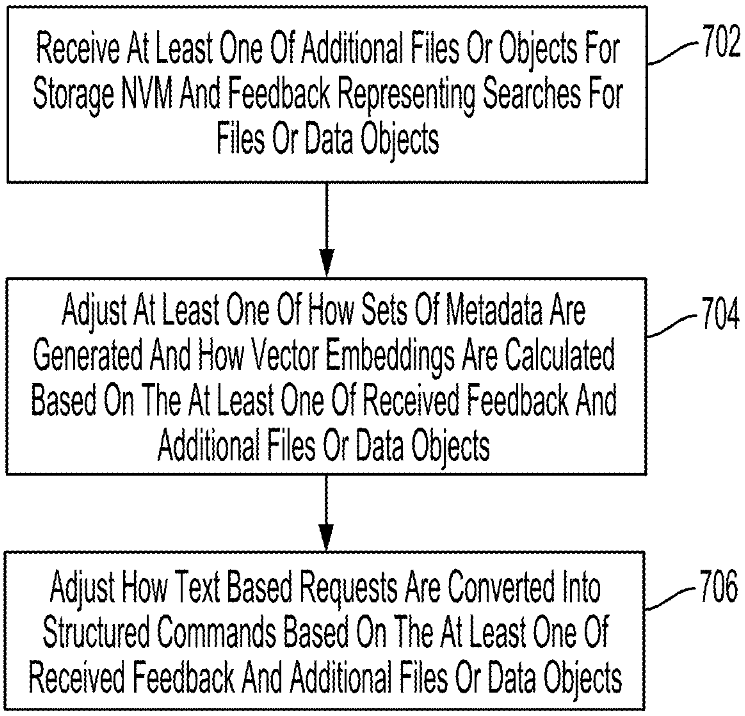
FIG. 7 is a flowchart for a fine-tuning process according to one or more embodiments.

FIG. 7 is a flowchart for a fine-tuning process according to one or more embodiments. The process of FIG. 7 can be performed by, for example, processor(s) 110 of storage interface 108, processor(s) 104 of host 102, and/or controller(s) 116 of storage device 114 in FIG. 1 executing fine-tuning module 20. In this regard, processor(s) 110, processor(s) 104, and/or controller(s) 116 can, in some implementations, comprise a means for performing the functions of the storage process of FIG. 7.

In block 702, additional files or data objects for storage are received and/or feedback representing a plurality of searches for files or data objects stored in an NVM (e.g., main storage 120 in FIG. 1). The feedback can include explicit feedback from a user following a search, such as how closely the search results matched the user's search criteria and/or may include derived feedback such as additional searching performed after an initial search using similar search criteria that may indicate that the initial search results were not what the user or application intended. The feedback may be collected over a period of time or for a predetermined number of searches or instances of receiving feedback.

The additional files or data objects are received using storage processes such as those described above for FIGS. 2 and 5 where sets of metadata are generated for the additional files or data objects to describe the files or data objects. In some implementations, the generated sets of metadata may be used to calculate vector embeddings for the additional files or data objects to represent the set of metadata for the file or data object.

In block 704, a fine-tuning module (e.g., fine-tuning module 20 in FIG. 1) adjusts at least one of how sets of metadata are generated and how vector embeddings are calculated based on the at least one of received feedback and additional files or data objects. For example, search terms, criteria, or keywords received from a storage user interface (e.g., storage user interface 12) may be collected over time and sorted by frequency. The fine-tuning module may modify a tagging module to add new metadata values for search terms, criteria, or keywords that were not previously represented in generated sets of metadata or may change a weighting used to calculate a vector embedding for generated sets of metadata to adjust the relative importance of a particular item of metadata. In some cases, the fine-tuning module may also cause a storage interface to recalculate vector embeddings or regenerate sets of metadata for files or objects already stored in the NVM based on the received feedback and/or additional files or data objects being stored in the NVM.

In block 706, the fine-tuning module adjusts how text based requests are converted into structured commands based on the at least one of received search feedback and additional files or data objects stored in the NVM. In some cases, the types of additional files or data objects are used for fine-tuning a storage interface LLM (e.g., storage interface LLM 18 in FIG. 1) to provide more accurate translations of the free text requests it receives into structured commands. For example, if the files or data objects stored in the NVM mostly relate to a particular field, such as a medical or engineering field, the understanding of free text including search criteria using terms from these fields can be improved with fine-tuning using the additional files or data objects stored in the NVM.

In addition, the search feedback can be used to evaluate the success or accuracy of the structured commands. For example, subsequent searches following an initial search may include synonyms or related words that the fine-tuning module can use to further train the LLM in generating structured commands. In some cases, the fine-tuning module may condense search terms or expand the categorization of search terms that are synonyms or closely related to each other to improve the translation of the text based requests.

Those of ordinary skill in the art will appreciate with reference to the present disclosure that other implementations of the fine-tuning process of FIG. 7 may differ. For example, other implementations may omit block 704 or block 706 so that only the conversion of text based requests is adjusted or only the way that sets of metadata or vector embeddings are generated is adjusted.

As discussed above, the foregoing data storage systems and processes can facilitate searching for files or data objects without knowing a particular storage location or identifier for the file or data object, such as knowing the file name or an object name. In addition, the foregoing data storage systems and processes enable free text searching that is more convenient for users and can provide a wider range of search criteria to be used, as compared to conventional data searching tools. The data storage systems and processes above can also improve the performance of data storage systems by organizing the storage of files or data objects based on their relatedness or similarity with respect to both content based and non-content based attributes, which can reduce the time to access related or similar files or data objects.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A data storage system, comprising:
- a Non-Volatile Memory (NVM) configured to store a plurality of at least one of files and data objects; and
- at least one processor, individually or in combination, configured to:
  - receive a file or data object for storage in the NVM;
  - generate a set of metadata based on characteristics of the file or data object;
  - calculate a first vector embedding using the set of metadata to represent the set of metadata;
  - determine a distance between the first vector embedding and at least one other vector embedding in a vector embedding space, the at least one other vector embedding representing at least one other set of metadata generated for at least one other file or data object;
  - determine a storage location in the NVM for the file or data object based at least in part on the determined distance between the vector embedding and the at least one other vector embedding; and
  - recalculate the vector embedding for files or objects already stored in the NVM using updated weights or a different number of dimensions based on feedback from searches and/or additional files or data objects stored in the NVM to improve performance of the data storage system and facilitate a faster combined reading and/or combined writing of files or data by reducing a combined read latency or write latency for the additional files or data objects and the files or objects already stored in the NVM.

2. The data storage system of claim 1, wherein in determining the storage location, the at least one processor, individually or in combination, is further configured to consider at least one of an indication of a combined read latency and an indication of a combined write latency for accessing the file or data object and the at least one other file or data object in the NVM.

3. The data storage system of claim 1, wherein in generating the set of metadata, the at least one processor, individually or in combination, is further configured to use content based information and non-content based information determined from the file or data object.

4. The data storage system of claim 1, wherein the at least one processor, individually or in combination, is further configured to use different Artificial Intelligence (AI) models for different types of file content or data object content to generate metadata describing one or more files or data objects.

5. The data storage system of claim 1, wherein the at least one processor, individually or in combination, is further configured to adjust at least one of how sets of metadata are generated and how vector embeddings are calculated based on at least one of feedback representing one or more searches for at least one file or data object stored in the NVM and additional files or additional data objects stored in the NVM.

6. The data storage system of claim 1, further comprising a low latency access memory, and wherein the at least one processor, individually or in combination, is further configured to store an index in the low latency memory associating a plurality of files or data objects stored in the NVM with corresponding sets of metadata generated for the plurality of files or data objects.

7. The data storage system of claim 6, wherein the index further stores an indication of a permission level to access the respective plurality of files or data objects.

8. The data storage system of claim 1, wherein the at least one processor, individually or in combination, is further configured to:
- receive a text based request to search for at least one file or data object stored in the NVM, wherein the text based request indicates at least one search criterion that does not specifically identify the at least one file or data object;
- convert the text based request into a structured command using an LLM;
- use the structured command to identify at least one storage location in the NVM for the at least one file or data object; and
- retrieve the at least one file or data object from the identified at least one storage location to provide in response to the text based request.

9. A data storage system, comprising:
- means to store a plurality of at least one of files and data objects; and at least one processor, individually or in combination, configured to:

receive a file or data object for storage in the means to store a plurality of at last one of files and data objects;

generate a set of metadata based on characteristics of the file or data object;

calculate a vector embedding using the set of metadata to represent the set of metadata;

determine a distance between the vector embedding and at least one other vector embedding in a vector embedding space, the at least one other vector embedding representing at least one other corresponding set of metadata generated for at least one other file or data object;

determine a storage location in the means to store a plurality of at last one of files and data objects for the file or data object based at least in part on the determined distance between the vector embedding and the at least one other vector embedding; and recalculate the vector embedding for files or objects already stored in the means to store a plurality of at least one of files and data objects using updated weights or a different number of dimensions based on feedback from searches and/or additional files or data objects stored in the means to store a plurality of at least one of files and data objects to improve performance of the data storage system and facilitate a faster combined reading and/or combined writing of files or data by reducing a combined read latency or write latency for the additional files or data objects and the files or objects already stored in the NVM.

10. The data storage system of claim 9, wherein the at least one processor, individually or in combination, is further configured to: in determining the storage location, consider at least one of an indication of a combined read latency and an indication of a combined write latency for accessing the file or data object and the at least one other file or data object in the means to store a plurality of at last one of files and data objects.

* * * * *